United States Patent
Yoo et al.

(10) Patent No.: US 9,680,136 B2
(45) Date of Patent: Jun. 13, 2017

(54) RECHARGEABLE BATTERY

(71) Applicant: SAMSUNG SDI CO., LTD., Yongin-si, Gyeonggi-do (KR)

(72) Inventors: Seungyeol Yoo, Yongin-si (KR); Huijun Lee, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 257 days.

(21) Appl. No.: 14/568,528

(22) Filed: Dec. 12, 2014

(65) Prior Publication Data

US 2015/0364731 A1 Dec. 17, 2015

(30) Foreign Application Priority Data

Jun. 17, 2014 (KR) .................. 10-2014-0073646

(51) Int. Cl.
| | | |
|---|---|---|
| *H01M 2/06* | (2006.01) | |
| *H01M 10/04* | (2006.01) | |
| *H01M 2/30* | (2006.01) | |
| *H01M 2/00* | (2006.01) | |

(52) U.S. Cl.
CPC ............. *H01M 2/06* (2013.01); *H01M 2/00* (2013.01); *H01M 2/30* (2013.01); *H01M 10/0431* (2013.01)

(58) Field of Classification Search
CPC .... H01M 10/0431; H01M 2/00; H01M 2/021; H01M 2/0217; H01M 2/06; H01M 2/30; H01M 2/22; H01M 2/26
See application file for complete search history.

(56) References Cited

U.S. PATENT DOCUMENTS

| | | | | |
|---|---|---|---|---|
| 6,562,493 | B2* | 5/2003 | Tsukada ................ | C23C 30/00 429/176 |
| 2011/0117402 | A1* | 5/2011 | Kim .................... | H01M 2/0237 429/94 |
| 2011/0244308 | A1* | 10/2011 | Byun .................. | H01M 2/204 429/158 |
| 2011/0244317 | A1 | 10/2011 | Lee et al. | |
| 2012/0021278 | A1 | 1/2012 | Byun et al. | |
| 2012/0183818 | A1* | 7/2012 | Byun .................. | H01M 2/0473 429/61 |
| 2013/0011724 | A1* | 1/2013 | Kado .................. | H01M 2/06 429/179 |
| 2014/0190952 | A1* | 7/2014 | Anderson ............ | B23K 35/383 219/146.22 |

FOREIGN PATENT DOCUMENTS

| | | |
|---|---|---|
| JP | 2001-357834 A | 12/2001 |
| KR | 10-2012-0010092 A | 2/2012 |
| KR | 10-2013-0067713 A | 6/2013 |
| KR | 10-2013-0122565 A | 11/2013 |

OTHER PUBLICATIONS

Extended European Search Report dated Aug. 24, 2015 in Corresponding European Patent Application No. 15168818.1.

* cited by examiner

*Primary Examiner* — Carlos Barcena
(74) *Attorney, Agent, or Firm* — Lee & Morse, P.C.

(57) ABSTRACT

A rechargeable battery including a case; a cap plate installed on the case; and a terminal, the terminal including a terminal pillar protruding from the cap plate, and a terminal plate coupled to the terminal pillar, wherein the terminal pillar includes a first pillar coupled to the terminal plate; second pillar coupled to the first pillar, and a welding member on an exterior of the first pillar or the second pillar.

19 Claims, 14 Drawing Sheets

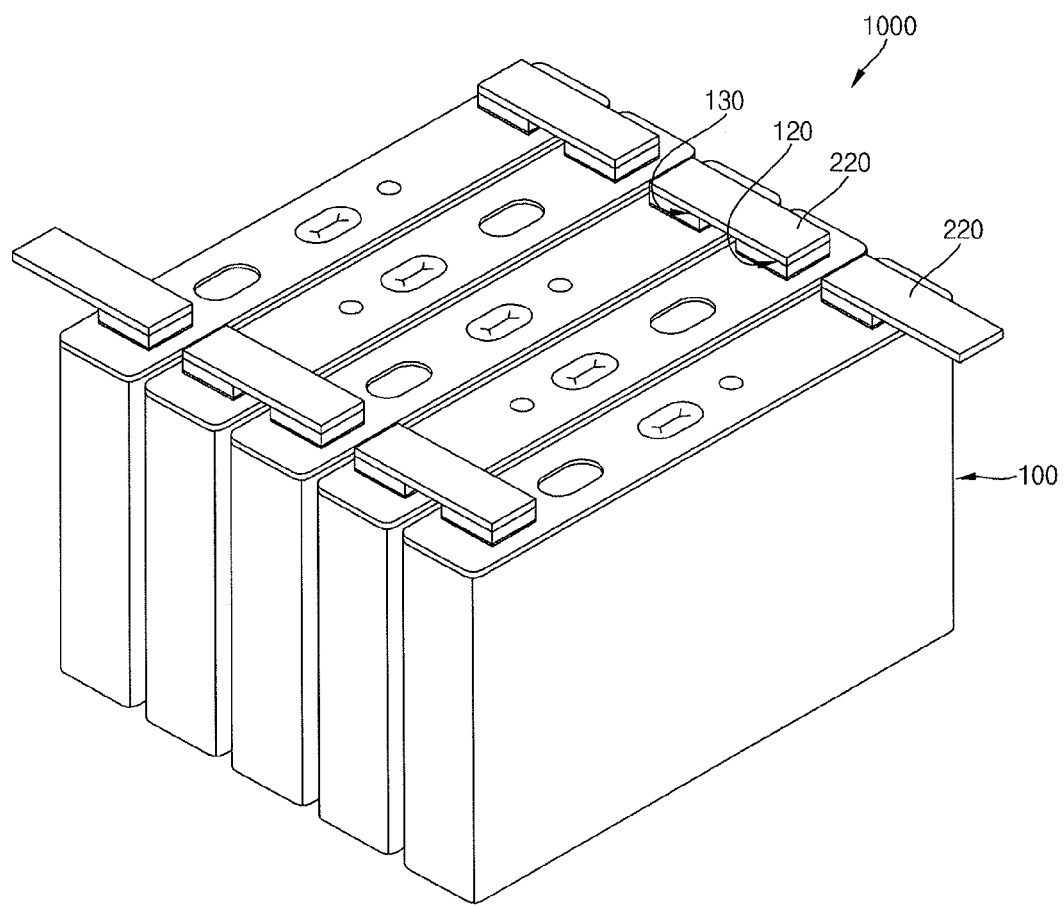

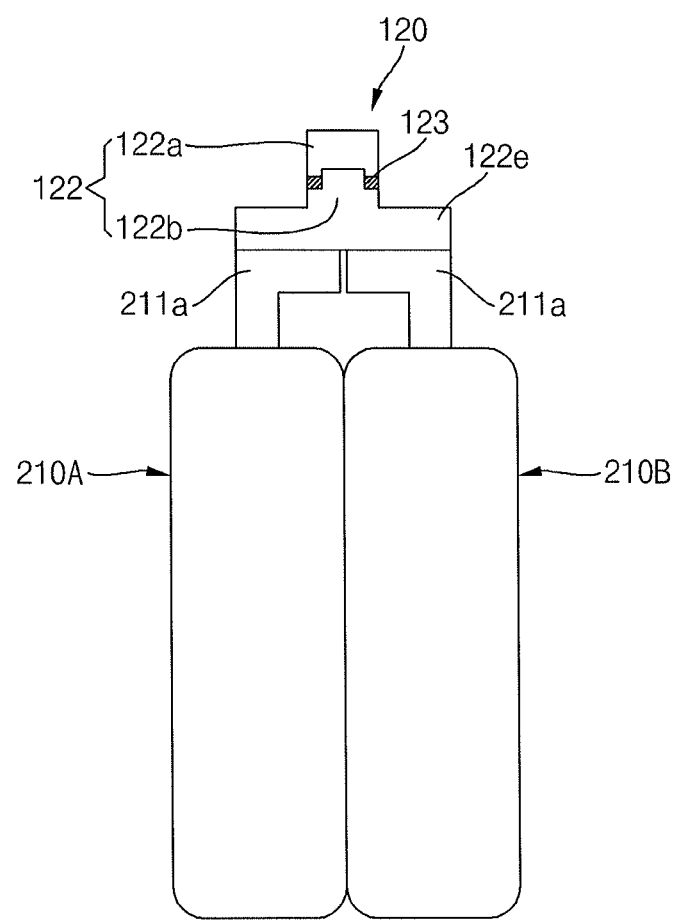

RECHARGEABLE BATTERY

CROSS-REFERENCE TO RELATED APPLICATION

Korean Patent Application No. 10-2014-0073646 filed on Jun. 17, 2014 in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

Unlike primary batteries, which cannot be recharged, rechargeable batteries may be repeatedly charged and discharged. Low capacity rechargeable batteries that use single battery cells may be used as power sources for various small-sized portable electronic devices, e.g., smart phones, digital cameras, notebook computers, tablets, or cellular phones. High capacity rechargeable batteries that use tens of battery cells connected to each other in a battery pack may be used as power sources for driving motors, e.g., in electric scooters or hybrid electric vehicles (HEV).

Rechargeable batteries may be manufactured in various shapes, and representative shapes thereof may include a cylindrical shape, a prismatic shape, and a pouch-like shape. Rechargeable batteries may be configured such that an electrode assembly which is formed by interposing a separator serving as an insulator between positive and negative electrodes, and an electrolyte solution are housed in a case, and a cap plate is installed in the case. Positive and negative electrode terminals may be connected to the electrode assembly and then exposed or protruded to the outside through the cap plate.

SUMMARY

Embodiments are directed to a rechargeable battery.

The embodiments may be realized by providing a rechargeable battery including a case; a cap plate installed on the case; and a terminal, the terminal including a terminal pillar protruding from the cap plate, and a terminal plate coupled to the terminal pillar, wherein the terminal pillar includes a first pillar coupled to the terminal plate; second pillar coupled to the first pillar, and a welding member on an exterior of the first pillar or the second pillar:

The terminal plate and the first pillar may be made of a same material.

The terminal plate and the first pillar may be made of aluminum or an aluminum alloy.

The first pillar and the second pillar may be made of different materials.

The first pillar may be made of aluminum or an aluminum alloy, and the second pillar may be made of copper or a copper alloy.

The welding member may be made of an alloy that includes aluminum and silicon.

The alloy of the welding member may be made of about 80 to about 95 wt % aluminum and about 5 to about 20 wt % silicon.

The welding member may be made of an alloy that includes tin and nickel.

The alloy of the welding member may be made of about 60 to about 70 wt % tin and about 30 to about 40 wt % nickel.

The first pillar may include a groove, the second pillar may include a protrusion engaged with the groove, and the welding member may be on a surface of the protrusion.

The first pillar may include a protrusion, the second pillar may include a groove engaged with the protrusion, and the welding member may be on a surface of the protrusion.

The first pillar and the terminal plate may be coupled to each other by welding.

The rechargeable battery may further include a second terminal, the second terminal including a second terminal pillar protruding from the cap plate, and a second terminal plate coupled to the second terminal pillar.

The second terminal pillar and the second terminal plate may be made of a same material.

The rechargeable battery may further include an electrode assembly within the case, the electrode assembly being electrically connected to the terminal, wherein a winding axis of the electrode assembly is perpendicular to a terminal axis of the terminal.

The rechargeable battery may further include an electrode assembly within the case, the electrode assembly being electrically connected to the terminal, wherein a winding axis of the electrode assembly is parallel to a terminal axis of the terminal.

The rechargeable battery may further include an electrode tab between the electrode assembly and the terminal, wherein the electrode tab extends from a top end of the electrode assembly to a bottom end of the terminal and is directly connected to the terminal.

The electrode tab may be an uncoated portion of the electrode assembly, the uncoated portion not being coated with an active material, or a separate member connected to the uncoated portion of the electrode assembly.

The electrode tab may be connected to the terminal and may be bent.

The electrode assembly may include at least one pair of electrode assemblies.

BRIEF DESCRIPTION OF THE DRAWINGS

Features will be apparent to those of skill in the art by describing in detail exemplary embodiments with reference to the attached drawings in which:

FIG. 6 illustrates a perspective view of an exemplary battery module using rechargeable batteries according to an embodiment;

FIG. 12 illustrates a schematic diagram showing two electrode assemblies welded to one terminal.

DETAILED DESCRIPTION

Figure 1:
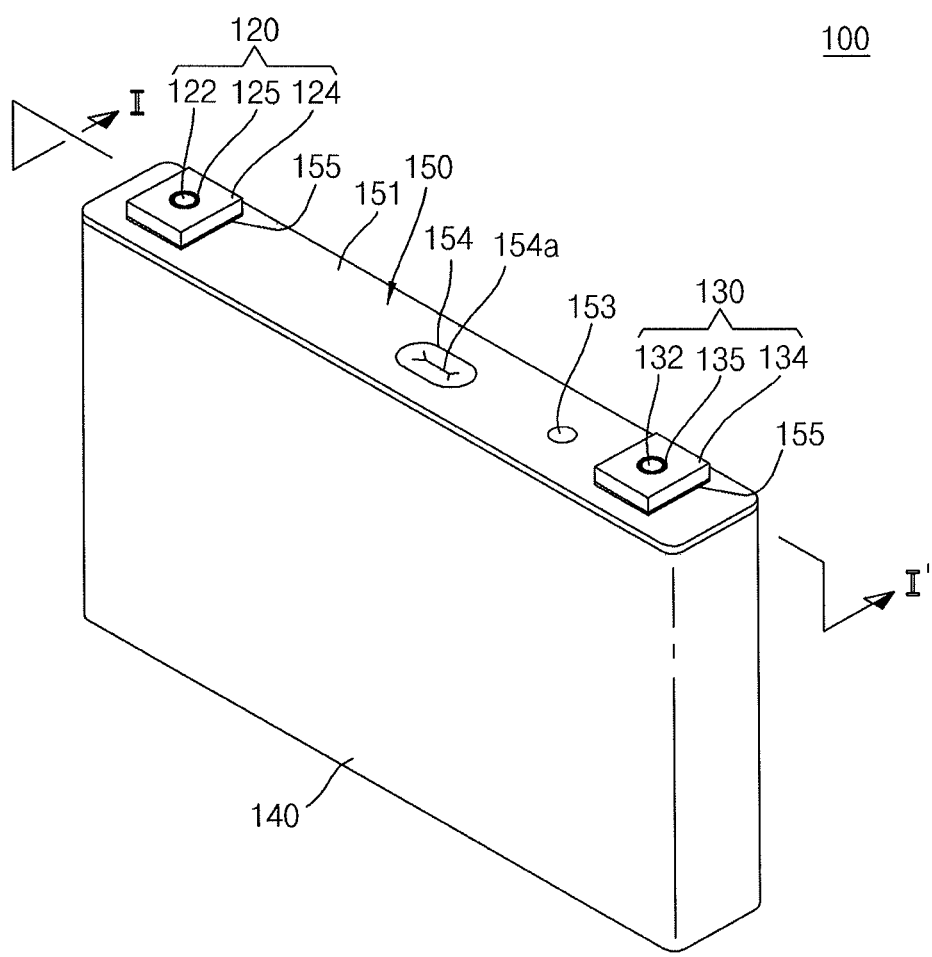
FIG. 1 illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, for example, a first element, a first component, a first region, a first layer or a first section discussed below could be termed a second element, a second component, a second region, a second layer or a second section without departing from the teachings of the present invention.

In addition, the term "welding member" as used herein includes materials capable of welding a first conductor (first pillar) made of or including, e.g., aluminum or an aluminum alloy, and a second conductor (second pillar) made of or including, e.g., copper or a copper alloy. In an example, the "welding member" is a concept encompassing, e.g., an aluminum-silicon alloy, a tin-nickel alloy, or the like. In addition, the term "welding member" may be the same material with a second conductor previously formed by performing electroplating or diffusive welding on a first conductor or the same material with a first conductor previously formed by performing electroplating or diffusive welding on a second conductor, and the meaning of the term "welding member" should be defined in the same manner as defined herein.

Figure 2:
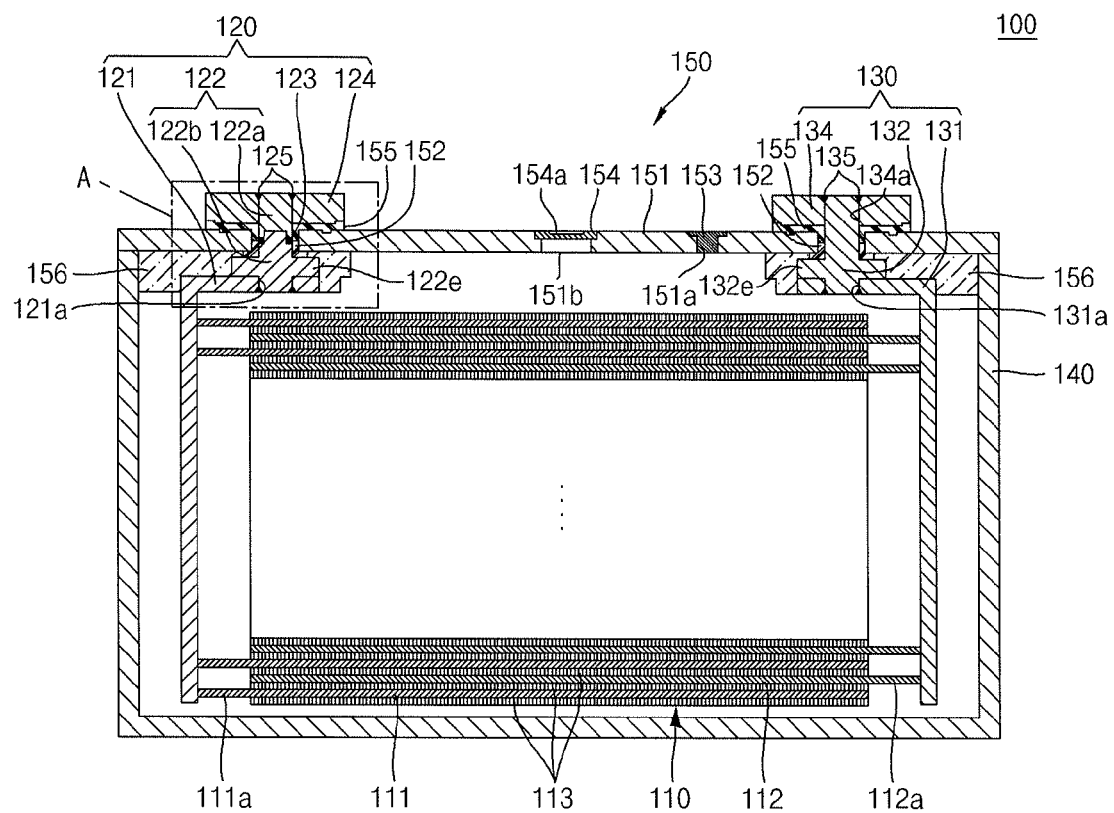
FIG. 2 illustrates a cross-sectional view taken along the line I-I' of the rechargeable battery shown in FIG. 1.
Figure 3:
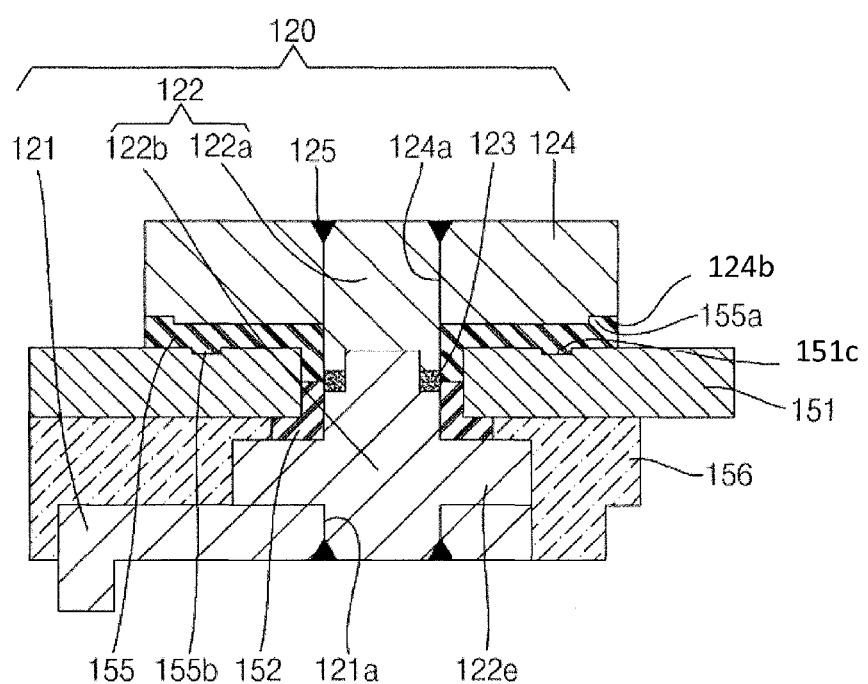
FIG. 3 illustrates an enlarged cross-sectional view of a portion 'A' shown in FIG. 2.

FIG. 1 illustrates a perspective view of a rechargeable battery according to an embodiment, FIG. 2 illustrates a cross-sectional view taken along the line I-I' of the rechargeable battery shown in FIG. 1, and FIG. 3 illustrates an enlarged cross-sectional view of a portion 'A' shown in FIG. 2.

As illustrated in FIGS. 1 to 3, the rechargeable battery 100 according to the embodiment may include an electrode assembly 110, a first terminal 120, a second terminal 130, a case 140, and a cap assembly 150.

The electrode assembly 110 may be formed by winding or laminating a stacked structure of a first electrode plate 111, a separator 113, and a second electrode plate 112, which are thin plates or layers. Here, the first electrode plate 111 may function as a negative electrode and the second electrode plate 112 may function as a positive electrode, or vice versa.

The first electrode plate 111 may be formed by coating a first electrode active material, e.g., graphite or carbon, on a first electrode collector formed of a metal foil made of, e.g., copper, a copper alloy, nickel or a nickel alloy, and may include a first electrode non-coated portion 111a that is not coated with the first electrode active material. The first electrode uncoated portion 111a may form a path of current flow between the first electrode plate 111 and the outside of the first electrode plate 111.

The second electrode plate 112 may be formed by coating a second electrode active material, e.g., a transition metal oxide, on a second electrode collector formed of a metal foil made of, e.g., aluminum or an aluminum alloy, and may include a second electrode uncoated portion 112a that is not coated with the second electrode active material. The second electrode uncoated portion 112a may form a path of current flow between the second electrode plate 112 and the outside of the second electrode plate 112.

The first electrode plate 111 and the second electrode plate 112 may have different polarities from each other.

The separator 113 may be positioned between the first electrode plate 111 and the second electrode plate 112 and may facilitate movement of lithium ions while preventing electrical shorts. The separator 113 may be made of, e.g., polyethylene, polypropylene, or a combination of polyethylene and polypropylene.

A first terminal 120 and a second terminal 130 (electrically connected to the first electrode plate 111 and the second electrode plate 112) may be positioned at opposite ends of the electrode assembly 110.

The electrode assembly 110 may be housed in the case 140 with an electrolyte solution. The electrolyte solution may include an organic solvent, e.g., dimethyl carbonate (DMC), diethyl carbonate (DEC), ethylmethyl carbonate (EMC), ethylene carbonate (EC), propylene carbonate (PC), or the like, and a lithium salt, e.g., $LiPF_6$ or $LiBF_4$. The electrolyte solution may be in a liquid, a solid, or a gel phase.

The first terminal 120 may be made of a metal and may be electrically connected to the first electrode plate 111. The first terminal 120 may include a first collector plate 121, a first terminal pillar 122, a welding member 123, and a first terminal plate 124. In an implementation, the first terminal pillar 122 may include a first pillar 122a (electrically/mechanically connected or welded to the first terminal plate 124) and a second pillar 122b (electrically/mechanically connected or welded to the first collector plate 121). The welding member 123 may weld the first pillar 122a and the second pillar 122b to each other, thereby electrically/mechanically connecting the first pillar 122a and the second pillar 122b with each other.

The first collector plate 121 may be brought into contact with the first electrode uncoated portion 111a that protrudes at one end of the electrode assembly 110. The first collector plate 121 may be welded to the first electrode uncoated portion 111a. The first collector plate 121 may have a roughly 'L' shape and may have a terminal hole 121a formed thereon. The first terminal pillar 122 may be fitted into the terminal hole 121a to then be riveted or welded thereto. The first collector plate 121 may be made of or may include, e.g., copper or a copper alloy.

The first terminal pillar 122 may penetrate through the cap plate 151 (which will be described in greater detail below), may protrude upwardly, may extend a predetermined length, and may be electrically connected to the first collector plate 121 from a lower portion of the cap plate 151. In an implementation, the first terminal pillar 122 may protrude upwardly and may extend a predetermined length from the cap plate 151, and the first terminal pillar 122 may have a flange 122e formed at a lower portion of the cap plate 151 to help prevent the first terminal pillar 122 from being dislodged from the cap plate 151. A region of the first terminal pillar 122 positioned at a lower portion of the flange 122e may be fitted into the first terminal hole 121a of the first collector plate 121 to then be riveted or welded thereto. The first terminal pillar 122 may be electrically insulated from the cap plate 151. The first terminal pillar 122 will now be described in more detail.

As described above, the first terminal pillar 122 may include the first pillar 122a and the second pillar 122b that are electrically/mechanically connected or welded to each other. The first pillar 122a and the second pillar 122 may be configured such that they are electrically/mechanically bonded or welded to each other inside the cap plate 151. In an implementation, the welding member 123 may also be positioned inside the cap plate 151. The first pillar 122a may be made of or may include, e.g., aluminum or an aluminum alloy, and may be easily welded to the first terminal plate 124 made of or including, e.g., aluminum or an aluminum alloy, which will be described in detail below. The second pillar 122b may be made of or may include, e.g., copper, a copper alloy, nickel, or a nickel alloy, and may be easily welded to the first collector plate 121 made of or including, e.g., copper, a copper alloy, nickel, or a nickel alloy.

The welding member 123 may be positioned on side surfaces of the first terminal pillar 122, e.g., on outer surfaces of the first pillar 122a and/or the second pillar 122b, thereby allowing the first pillar 122a and the second pillar 122b to be electrically/mechanically connected to each other. For example, the welding member 123 may encircle or surround an outer side or outer circumferential surface of the first pillar 122a or the second pillar 122b.

The welding member 123 may include, e.g., an aluminum-silicon alloy or an alloy that includes aluminum and silicon. In an implementation, the welding member 123 may include an alloy of, e.g., about 80 to about 95 wt % aluminum and about 5 to about 20 wt % silicon. Maintaining the amount of silicon in the alloy at about 5 wt % or greater may help reduce the probability of cracks occurring during congelation. Maintaining the amount of silicon in the alloy at about 20 wt % or less may help prevent welding flowability from becoming too large, thereby preventing undesirable deterioration in welding workability.

In an implementation, the welding member 123 may include, e.g., a tin-nickel alloy or an alloy that includes tin and nickel. In an implementation, the welding member 123 may include an alloy of, e.g., about 60 to about 70 wt % tin and about 30 to about 40 wt % nickel.

In the terminal according to an embodiment, the first pillar 122a (made of or including, e.g., aluminum or an aluminum alloy) and the second pillar 122b (made of or including, e.g., copper, a copper alloy, nickel, or a nickel alloy) may otherwise be highly sensitive to welding cracks (highly prone to welding cracks), and the welding member 123 may help reduce the sensitivity to welding cracks.

The first terminal plate 124 may have a hole 124a, and the first terminal pillar 122, e.g., the first pillar 122a, may be engaged with the hole 124a to then be welded thereto. As described above, the first terminal plate 124 may be made of or may include, e.g., aluminum or an aluminum alloy, and the first pillar 122a may also be made of or may include, e.g., aluminum or an aluminum alloy, and the first terminal plate 124 and the first pillar 122a may be easily welded to each other. For example, interfacial surfaces of the upwardly protruding first pillar 122a and the first terminal plate 124 may be welded to each other. In an implementation, laser beams may be incident into boundary areas of the upwardly protruding first pillar 122a and the first terminal plate 124, and the boundary areas may be fused and cooled to then weld the first pillar 122a and the first terminal plate 124 to each other. The welded areas are denoted by reference numeral 125 in FIG. 3.

As described above, the first pillar 122a of the first terminal pillar 122 may be made of or may include, e.g., aluminum or an aluminum alloy, and the first pillar 122a may be easily welded to the first terminal plate 124 made of or including, e.g., aluminum or an aluminum alloy. Accordingly, a bus bar (see FIG. 6) made of or including, e.g., aluminum or an aluminum alloy, may also be easily welded to the first terminal plate 124.

The second terminal 130 may be made of a metal and may be electrically connected to the second electrode plate 112. The second terminal 130 may include a second collector plate 131, a second terminal pillar 132, and a second terminal plate 134.

The second collector plate 131 may be brought into contact with the second electrode uncoated portion 112a that protrudes at one end of the electrode assembly 110. The second collector plate 131 may have a roughly 'L' shape and may have a terminal hole 131a formed thereon. The second terminal pillar 132 may be fitted into the terminal hole 131a to then be riveted or welded thereto. The second collector plate 131 may be made of or may include, e.g., aluminum or an aluminum alloy.

The second terminal pillar 132 may penetrate through the cap plate 151 (which will be described in greater detail below) and may protrude upwardly, may extend a predetermined length, and may be electrically connected to the second collector plate 131 from a lower portion of the cap plate 151. In an implementation, the second terminal pillar 132 may protrude upwardly, may extend a predetermined length from the cap plate 151, and the second terminal pillar 132 may have a flange 132e formed at a lower portion of the cap plate 151 to help prevent the second terminal pillar 132 from being dislodged from the cap plate 151. A region of the second terminal pillar 132 positioned at a lower portion of the flange 132e may be fitted into the second terminal hole 131a of the second collector plate 131 to then be riveted or welded thereto. Here, the second terminal pillar 132 may be electrically insulated from the cap plate 151. The second terminal pillar 132 may be made of or may include, e.g., aluminum or an aluminum alloy.

The second terminal plate 134 may have a hole 134a. The second terminal plate 134 may be coupled to the second terminal pillar 132. For example, the second terminal pillar 132 may be coupled to the hole 134a of the second terminal plate 134. In an implementation, the second terminal pillar 132 and the second terminal plate 134 may be welded to each other. For example, interfacial surfaces of the upwardly protruding second terminal pillar 132 and the second terminal plate 134 may be welded to each other. For example, laser beams may be incident into boundary areas of the upwardly protruding second terminal pillar 132 and the second terminal plate 134, and the boundary areas may be fused and cooled to then weld the second terminal pillar 132 and the second terminal plate 134 to each other at welded areas 135.

As described above, the second terminal pillar 132 may be made of or may include, e.g., aluminum or an aluminum alloy, and the second terminal plate 134 may also be made of or include, e.g., aluminum or an aluminum alloy, and the second terminal pillar 132 and the second terminal plate 134 may be easily welded to each other while demonstrating excellent welding quality.

In an implementation, a bus bar (see FIG. 6) made of or including, e.g., aluminum or an aluminum alloy, may be easily welded to the second terminal plate 134. In an implementation, the second terminal plate 134 may be electrically connected to the cap plate 151, so that the cap plate 151 and the case 140 (which will be described in greater detail below) may have the same polarity (e.g., a positive polarity) with the second terminal 130.

As described above, the second terminal 130 including the second collector plate 131, the second terminal pillar 132, and the second terminal plate 134 may all be made of or may include, e.g., aluminum or an aluminum alloy, the welding member 123 may not be separately provided, unlike in the first terminal 120.

In an implementation, a winding axis of the electrode assembly 110, e.g., a horizontal axis extending in a left-right direction in FIG. 2, may be roughly perpendicular to or positioned at right angle with respect to a terminal axis of the first terminal pillar 122 of the first terminal 120 (e.g., a vertical axis extending in an up-down direction in FIG. 2).

The case 140 may be made of a conductive metal, e.g., aluminum, aluminum alloy, or nickel plated steel, and may have an approximately hexagonal shape that defines an opening through which the electrode assembly 110, the first terminal 120, and the second terminal 130 are inserted and placed in the case 140. Referring to FIG. 2 illustrating a state in which the case 140 and the cap assembly 150 are assembled, although an opening is not shown, the opening corresponds to a circumference of the cap assembly 150. The case 140 may have an inner surface subjected to insulating treatment to be insulated from the electrode assembly 110, the first terminal 120, the second terminal 130, and the cap assembly 150.

The cap assembly 150 may be coupled to the case 140. For example, the cap assembly 150 may include a cap plate 151, a seal gasket 152, a plug 153, a safety vent 154, an upper insulation member 155, and a lower insulation member 156.

The cap plate 151 may seal an opening of the case 140 and may be made of or may include a same material as the case 140. For example, the cap plate 151 may be coupled to the case 140 by laser welding. As described above, the cap plate 151 and the second terminal 130 may have the same polarity, and the cap plate 151 and the case 140 may also have the same polarity.

The seal gasket 152, made of or including an insulating material, may be located between each of the first terminal pillar 122 and the second terminal pillar 132 and the cap plate 151, and may seal gaps between each of the first terminal pillar 122 and the second terminal pillar 132 and cap plate 151. The seal gasket 152 may help prevent external moisture from penetrating into the rechargeable battery 100 and/or may help prevent an electrolytic solution contained in the rechargeable battery 100 from flowing out.

The plug 153 may seal an electrolyte injection hole 151a of the cap plate 151. The safety vent 154 may be installed in a vent hole 151b of the cap plate 151 and may have a notch 154a to be opened at a preset pressure.

The upper insulation member 155 may be formed between each of the first terminal pillar 122 and the second terminal pillar 132 and the cap plate 151. In addition, the upper insulation member 155 may be closely adhered to the cap plate 151. For example, the cap plate 151 may include a notch 151c therein to receive a protrusion 155b in the upper insulation member 155. Further, the upper insulation member 155 may also be closely adhered to the seal gasket 152. Finally, the upper insulation member 155 may include a protrusion 155a to be received by a notch 124b in the first terminal plate 124. The upper insulation member 155 may insulate each of the first terminal pillar 122 and the second terminal pillar 132 from the cap plate 151.

The lower insulation member 156 may be formed between each of the first collector plate 121 and the second collector plate 131 and the cap plate 151 and may help unnecessary and undesirable shorts from occurring between each of the first collector plate 121 and the second collector plate 131 and the cap plate 151. For example, the lower insulation member 156 may help prevent short-circuits from occurring between the first collector plate 121 and the cap plate 151 and/or between the second collector plate 131 and the cap plate 151.

The welding member 123 may be located inside the cap plate 151, e.g., inside the seal gasket 152 and/or the upper insulation member 155, and corrosion or oxidation of the welding member 123 (due to external factors) may be avoided. In addition, a mechanical shock may not be directly applied to the welding member 123 from the outside, and it is possible to help prevent the welding member 123 from being broken down or being cut off. In an implementation, an electrical resistance value of the welding member 123 may become unexpectedly greater than that of the first pillar 122a or the second pillar 122b, and a predetermined region of the second pillar 122b (having a relatively small diameter) may function as a fuse to then be cut or melted during over-charge or external short-circuit of the rechargeable battery 100, thereby improving the reliability and safety of the rechargeable battery 100.

Figure 4A:
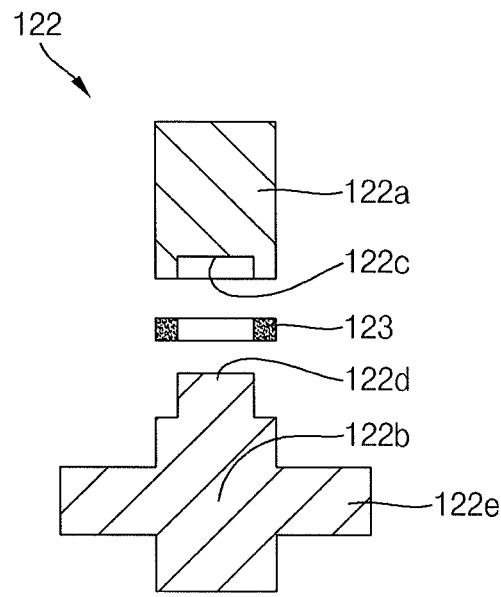
FIGS. 4A and 4B illustrate diagrams of stages in a method for fabricating a terminal pillar of the rechargeable battery shown in FIG. 1.
Figure 4B:
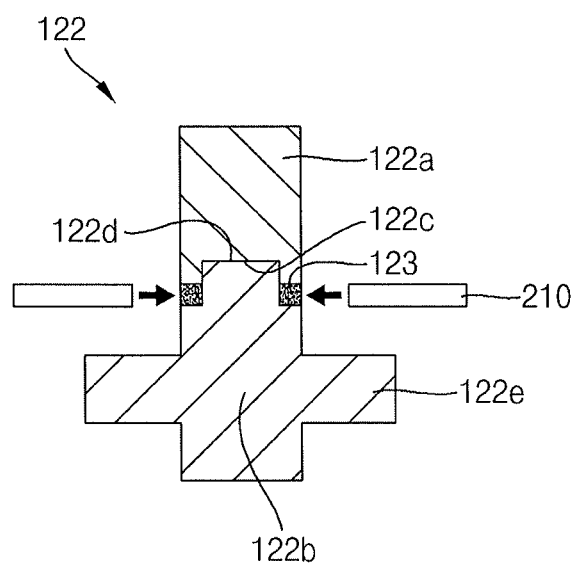

FIGS. 4A and 4B illustrate diagrams of stages in a method for fabricating a terminal pillar of the rechargeable battery shown in FIG. 1.

As illustrated in FIG. 4A, the first pillar 122a made of or including, e.g., aluminum or an aluminum alloy, may be formed to have a groove 122c of a predetermined depth at a bottom end thereof. The second pillar 122b made of or including, e.g., copper, a copper alloy, nickel, or a nickel alloy, may be formed to have a protrusion 122d of a predetermined length at a top end thereof. In addition, the welding member 123 (having a roughly annular shape) may be coupled to an exterior side of or around the protrusion 122d of the second pillar 122b, and the protrusion 122d of the second pillar 122b may be coupled to the first pillar 122a at the groove 122c of the first pillar 122a, e.g., at an exterior bottom side of the first pillar 122a. For example, the protrusion 122d of the second pillar 122b may be mechanically coupled to the groove 122c of the first pillar 122a.

In an implementation, a protrusion may be formed at a bottom end of the first pillar 122a, and a groove may be formed at a top end of the second pillar 122b, thereby allowing the protrusion of the first pillar 122a to be engaged with the groove of the second pillar 122b. In his case, the welding member 123 may be fitted into, onto, or around the protrusion of the first pillar 122a.

As illustrated in FIG. 4B, in a state in which the first pillar 122a and the second pillar 122b (made of or including different materials) are coupled to each other using the groove 122c and/or the protrusion 122d, laser beams from a laser welding device 210 may be incident onto the welding member 123. Then, the welding member 123 may be fused to electrically/mechanically connect the first pillar 122a and the second pillar 122b (that are made of or include different materials). Here, as described above, even after the welding member 123 is cooled, cracks may not be created on its surface, so that a high quality of welding between the first pillar 122a and the second pillar 122b may be maintained.

As described above, the protrusion 122d of the second pillar 122b may be engaged with the groove 122c of the first pillar 122a, and a surface of the groove 122c of the first pillar 122a and a surface of the protrusion 122d of the second pillar 122b may be electrically/mechanically connected to each other. Therefore, with this coupling structure of the groove 122c and the protrusion 122d, a coupling area and a coupling force between the groove 122c and the protrusion 122d may be increased, and compressive and/or tensile strengths of the first pillar 122a and the second pillar 122b against lateral stress may be improved. In addition, circumferences of the first pillar 122a and the second pillar 122b may be completely welded to each other by the welding member 123, thereby improving compressive and/or tensile strengths of the first pillar 122a and the second pillar 122b against longitudinal stress. For example, the coupling structure of the first pillar 122a and the second pillar 122b according to an embodiment may allow different materials to be bonded with each other, while also improving lateral and longitudinal compressive and/or tensile strengths.

Figure 5A:
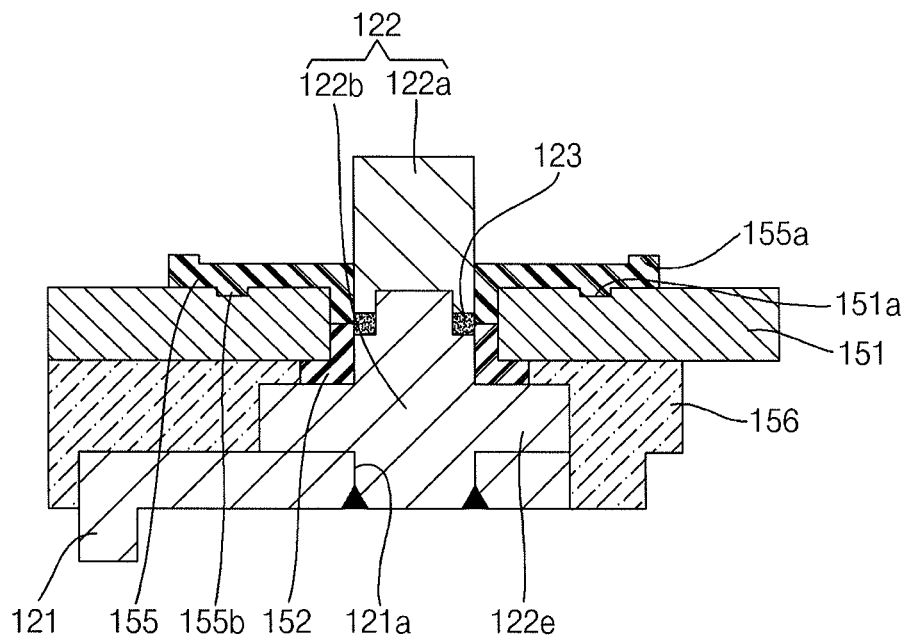
FIGS. 5A and 5B illustrate diagrams of stages in a method for coupling a terminal plate to a terminal pillar of a rechargeable battery according to an embodiment.
Figure 5B:
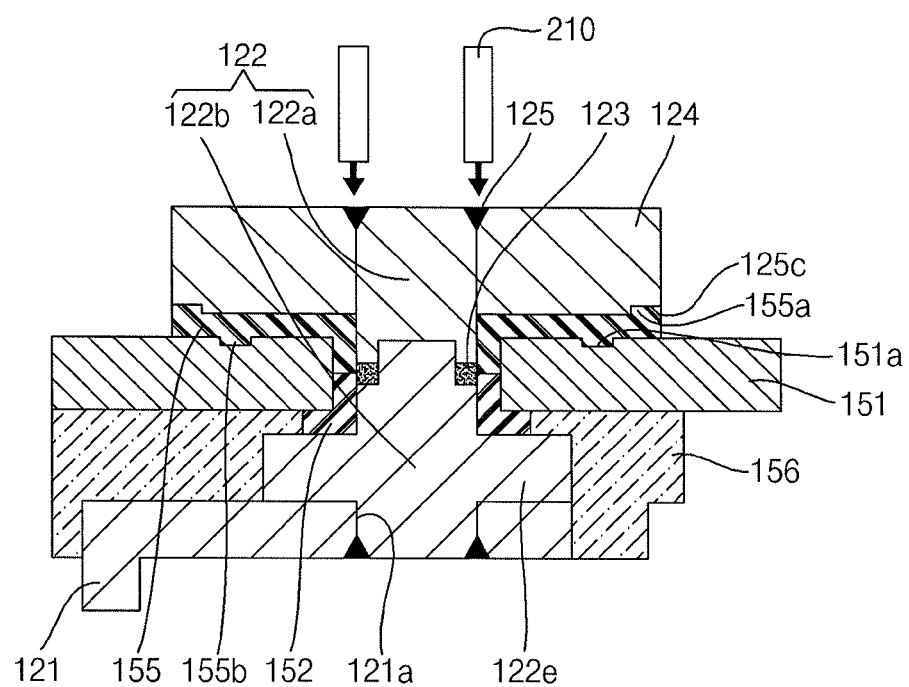

FIGS. 5A and 5B illustrate diagrams of stages in a method for coupling a terminal plate to a terminal pillar of a rechargeable battery according to an embodiment.

As illustrated in FIG. 5A, the second pillar 122b of the terminal pillar 122 may be coupled to the first collector plate 121 and then riveted or laser-welded thereto, thereby allowing the second pillar 122b of the first terminal pillar 122 to be mechanically/electrically connected to the first collector plate 121. In addition, the first terminal pillar 122 may be coupled to the cap plate 151, and the first pillar 122a of the first terminal pillar 122 may protrude to the outside of the cap plate 151.

As illustrated in FIG. 5B, the first terminal plate 124 may be coupled to the first pillar 122a of the terminal pillar 122 protruding through the cap plate 151. Laser beams from a laser welding device 210 may be incident into interfacial surfaces of the first pillar 122a and the terminal plate 124, thereby allowing the interfacial first pillar 122a and the terminal plate 124 to be welded to each other. For example, the first pillar 122a and the terminal plate 124 may be made of or may include, e.g., aluminum or an aluminum alloy, and the first pillar 122a and the terminal plate 124 may be easily welded to each other.

FIG. 6 illustrates a perspective view of an exemplary battery module using rechargeable batteries according to an embodiment.

As illustrated in FIG. 6, a plurality of rechargeable batteries 100 may be arranged in a line, and a plurality of bus bars 220 may be coupled to the rechargeable batteries 100 arranged in a line, thereby completing one battery module 1000. For example, a first terminal 120 of one of the rechargeable batteries 100 and a second terminal 130 of another rechargeable battery adjacent to the one rechargeable battery may be welded to the bus bar 220, thereby providing the battery module 1000 having the plurality of rechargeable batteries 100 connected in series to each other. Here, the bus bar 220 may be made of or may include, e.g., aluminum or an aluminum alloy, the first terminal plate 124 of the first terminal 120 and the second terminal plate 134 of the second terminal 130 may also be made of or may include, e.g., aluminum or an aluminum alloy, the bus bar 220 may be easily welded to the first terminal 120 and the second terminal 130.

Figure 7A:
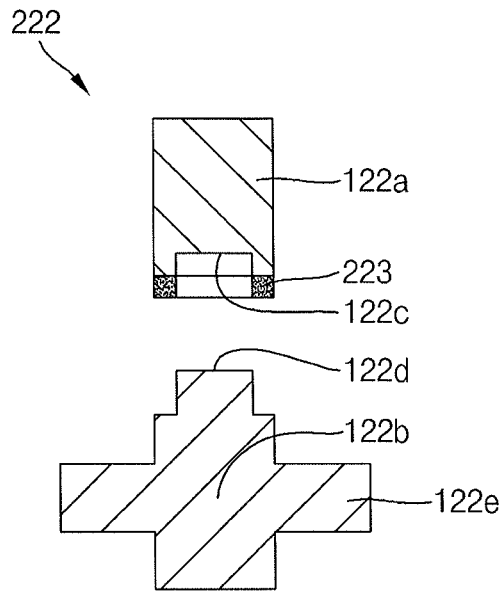
FIGS. 7A and 7B illustrate diagrams of stages in a method for fabricating a terminal pillar of a rechargeable battery according to another embodiment.
Figure 7B:
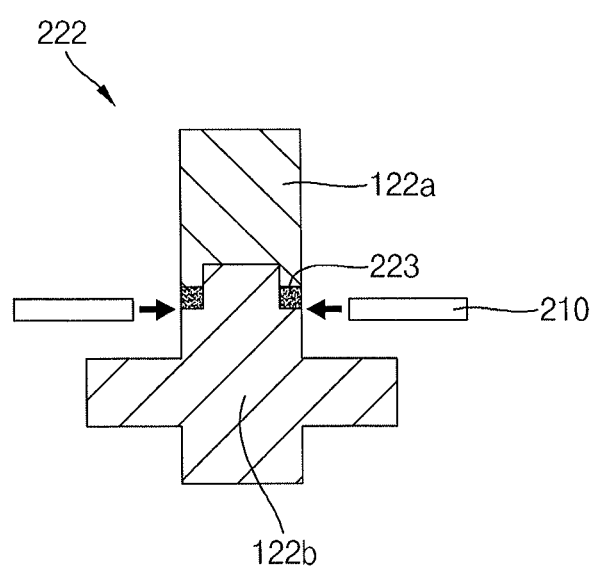

FIGS. 7A and 7B illustrate diagrams of stages in a method for fabricating a terminal pillar (222) of a rechargeable battery according to another embodiment.

As illustrated in FIG. 7A, a welding member 223 (previously electroplated with, e.g., copper or a copper alloy) may be provided at a bottom end of an exterior side of a groove 122c of the first pillar 122a. For example, in a state in which a positive voltage is applied to the first pillar 122a and a negative voltage is applied to a plating solution, the bottom end of the first pillar 122a may be dipped into the plating solution. In an implementation, the plating solution may include one selected from the group of, e.g., copper sulfate, copper fluoborate, copper sulfaminic acid, copper cyanide, copper pyrophosphate, or the like. The electroplating may be performed until the welding member 223 has a thickness of approximately 1 mm or greater. Maintaining the thickness of the welding member 223 at approximately 1 mm or greater may facilitate welding between the welding member 223 of the first pillar 122a and the second pillar 122b, e.g., establishment of a welding area between the welding member 223 and the second pillar 122b may be large enough to achieve the welding.

In an implementation, an insulator (not shown) may be formed on the surface of the first pillar 122a, except for the bottom end of the first pillar 122a, during the electroplating process, and the welding member 223 may not be formed on surfaces other than or distal to the bottom end of the first pillar 122a.

As illustrated in FIG. 7B, laser beams from a laser welding device 210 may be incident into a region between the welding member 123 formed in the first pillar 122a and the second pillar 122b. Then, the welding member 223 (made of or including, e.g., copper or a copper alloy) and the second pillar 122b (made of or including, e.g., copper or a copper alloy) may be fused to then be easily welded to each other.

Figure 8A:
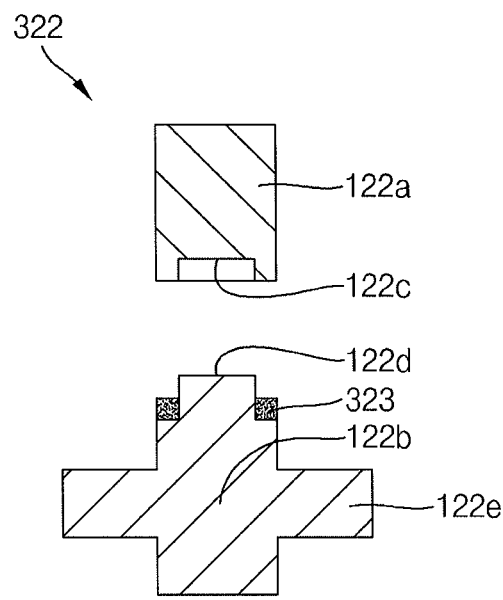
FIGS. 8A and 8B illustrate diagrams of stages in a method for fabricating a terminal pillar of a rechargeable battery according to still another embodiment.
Figure 8B:
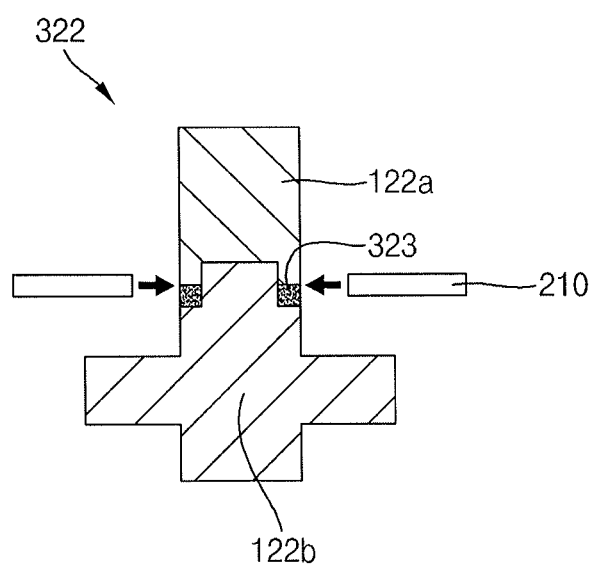

FIGS. 8A and 8B illustrate diagrams of stages in a method for fabricating a terminal pillar (322) of a rechargeable battery according to still another embodiment.

As illustrated in FIG. 8A, a welding member 323 (previously electroplated with, e.g., aluminum or an aluminum alloy) may be provided at a lateral surface of a protrusion 122d of the second pillar 122b. For example, in a state in which a positive voltage is applied to the second pillar 122b and a negative voltage is applied to a plating solution, the lateral surface of the protrusion 122d of the second pillar 122b may be dipped into the plating solution. In an implementation, the plating solution may include one selected from the group of, e.g., aluminum chloride ($AlCl_3$), aluminum bromide ($AlBr_3$), or the like. The electroplating process may be performed until the welding member 323 has a thickness of approximately 1 mm or greater. Maintaining the thickness of the welding member 323 at approximately 1 mm or greater may facilitate welding between the first pillar 122a and the welding member 323 formed in the second pillar 122b due to establishment of a large enough welding area between the first pillar 122a and the welding member 323 for achieving the welding.

In an implementation, an insulator (not shown) may be formed on the surface of the second pillar 122b, except for the lateral surface of the protrusion 122d of the second pillar 122b during the electroplating process, and the welding member 323 may not be formed on the surface other than the lateral surface of the protrusion 122d.

As illustrated in FIG. 8B, laser beams from a laser welding device 210 may be incident onto a region between the welding member 323 of the second pillar 122b and the first pillar 122a. Then, the welding member 323 (that is made of or includes, e.g., aluminum or an aluminum alloy) and the first pillar 122a (that is made of or includes, e.g., aluminum or an aluminum alloy) may be fused to then be easily welded to each other.

In an implementation, the welding member may be formed not only by the electroplating process, but also or alternatively by a diffusion process. For example, the welding member and the first pillar, or the welding member and the second pillar, may be placed in a furnace, and a temperature of the furnace may be allowed to slowly increase until it reaches approximately 400 to 1,100° C. Then, diffusion may occur between the first pillar (that is made of or includes, e.g., aluminum or an aluminum alloy) and the welding member (that is made of or includes, e.g., copper or a copper alloy), or between the second pillar (that is made of or includes, e.g., copper or a copper alloy) and the welding member (that is made of or includes, e.g., aluminum or an aluminum alloy). Accordingly, the first pillar and the welding member, or the second pillar and the welding member, may be coupled to each other. For example, the first pillar and the welding member may be diffusively welded to each other, or the second pillar and the welding member may be diffusively welded to each other. In an implementation, in order to help prevent internal stress from being generated in the first pillar and the welding member or in the second pillar and the welding member, the temperature of the furnace may be slowly cooled down to room or ambient temperature. For example, during the diffusive welding, an inter-metal layer may be formed between the first pillar and the welding member, or between the second pillar and the welding member.

According to the diffusive welding, a welding strength between the first pillar and the welding member or between the second pillar and the welding member may be improved, and a separate plating device may not be required. In addition, according to the diffusive welding, an inter-metal layer may be formed between the first pillar and the welding member, or between the second pillar and the welding member, thereby improving welding strength.

Figure 9:
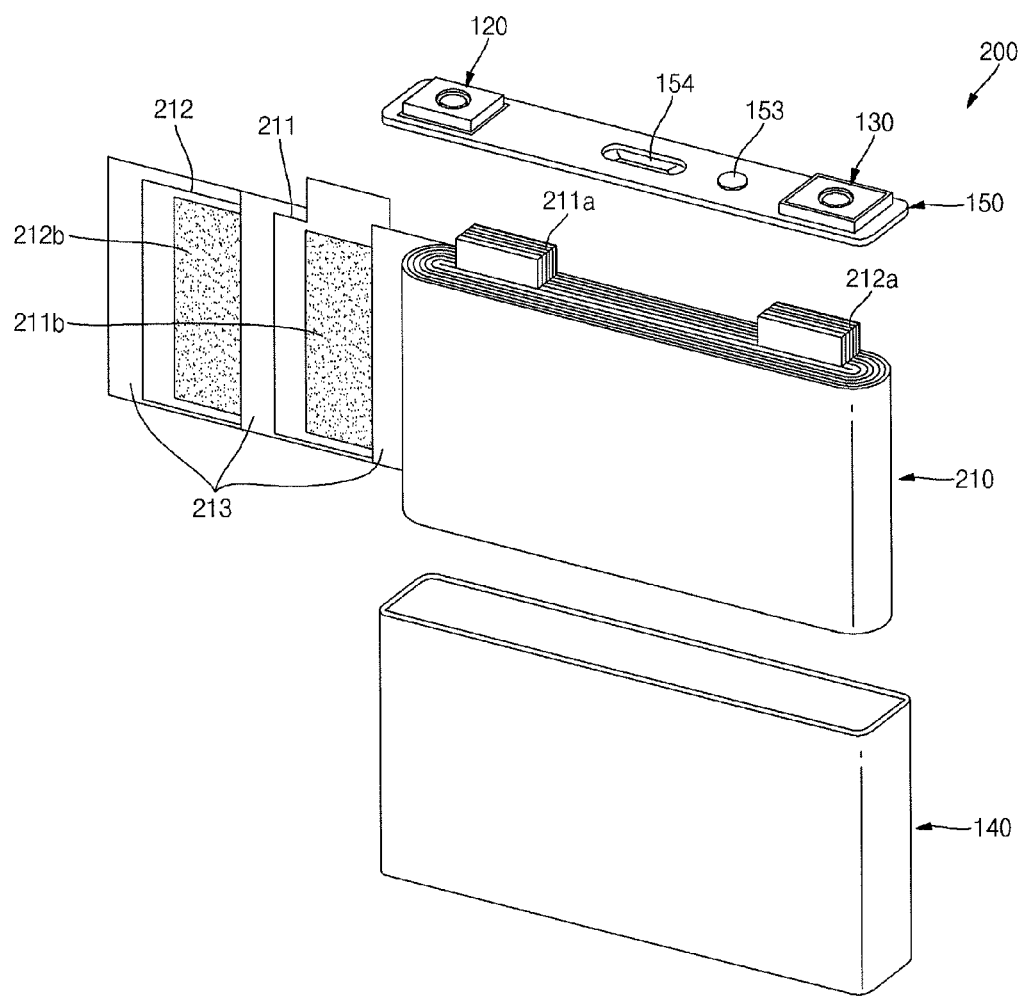
FIG. 9 illustrates an exploded perspective view of a rechargeable battery according to still another embodiment.
Figure 10:
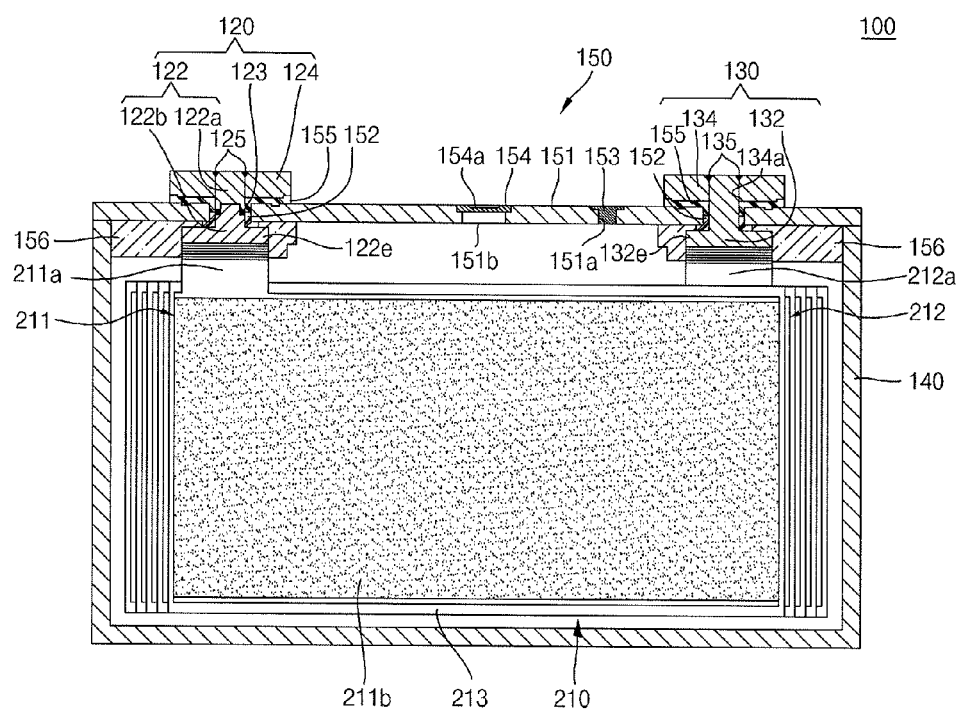
FIG. 10 illustrates a longitudinal cross-sectional view of the rechargeable battery shown in FIG. 9.

FIG. 9 illustrates an exploded perspective view of a rechargeable battery according to still another embodiment, and FIG. 10 illustrates a longitudinal cross-sectional view of the rechargeable battery shown in FIG. 9.

The rechargeable battery 200 according to the present embodiment may have a different configuration from the rechargeable battery 100 according to the previous embodiment in view of connection relationships between an electrode assembly 220 and each of the terminals 120 and 130. The rechargeable battery 200 may be substantially the same with the rechargeable battery 100 according to the previous embodiment in view of a configuration of a terminal. For example, the rechargeable battery 200 may include a terminal having a terminal pillar, and the terminal pillar may include a first pillar coupled to a terminal plate, a second pillar coupled to the first pillar, welding members formed at exterior sides of the first pillar and the second pillar, and a flange formed at a bottom end of the second pillar. Therefore, a description of the terminal of the rechargeable battery 200 will only be briefly made.

As illustrated in FIGS. 9 and 10, a winding axis of the electrode assembly 210 may be substantially parallel or even with a terminal axis of the parallel pillar 122 of a first terminal 120 and a terminal axis of the second terminal pillar 132 of a second terminal 130. For example, the winding axis and the terminal axis refer to axes formed in up-down or vertical directions in FIGS. 9 and 10. The expression "the winding axis and the terminal axis being substantially parallel or even with each other" means that the winding axis and the terminal axis may not meet each other even by stretching them or may meet each other by stretching them very long.

In addition, a first electrode tab 211a may be positioned between the electrode assembly 210 and the first terminal pillar 122 of the first terminal 120, and a second electrode tab 212a may be positioned between the electrode assembly 210 and the second terminal pillar 132 of the second terminal 130. For example, the first electrode tab 211a may extend from a top end of the electrode assembly 210 to a bottom end of the first terminal pillar 122 of the first terminal 120 to then be electrically connected to or welded to a planar flange 122e of the first terminal pillar 122. In addition, the second electrode tab 212a may extend from the top end of the electrode assembly 210 to a bottom end of the second terminal pillar 132 of the second terminal 130 to then be electrically connected to or welded to a planar flange 132e of the second terminal pillar 132.

In an implementation, the first electrode tab 211a may be a first uncoated portion of the first electrode plate 211, which is not coated with a first electrode active material 211b, or a separate member connected to the first uncoated portion. For example, the first uncoated portion and the first electrode plate 211 may be made of the same material, and the separate member may be made of one selected from the group of nickel, a nickel alloy, copper, a copper alloy, aluminum or an aluminum alloy, or the like.

In an implementation, the second electrode tab 212a may be a first uncoated portion of the second electrode plate 212, which is not coated with a second electrode active material 212b, or a separate member connected to the second uncoated portion. For example, the second uncoated portion and the second electrode plate 212 may be made of the same material, and the separate member may be made of one selected from the group of nickel, a nickel alloy, copper, a copper alloy, aluminum or an aluminum alloy, or the like.

As described above, a winding axis of an electrode assembly and a terminal axis of a terminal may be substantially parallel or level with each other, high electrolyte impregnating capability may be demonstrated when an electrolyte is injected into the electrode assembly, and internal gases may rapidly move to a safety vent when the rechargeable battery is overcharged, thereby allowing the safety vent to rapidly operate.

In addition, according to an embodiment, an electrode tab (e.g., the uncoated portion or separate member) of the electrode assembly may be directly electrically connected to the terminal, and an electric path may be shortened, thereby lowering internal resistance of the rechargeable battery and reducing a number of components in the rechargeable battery.

Figure 11A:
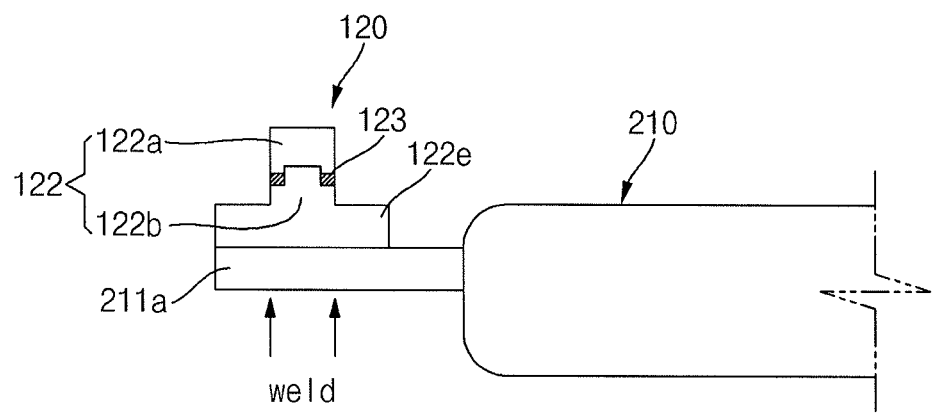
FIG. 11A illustrates a schematic diagram showing an electrode tab of an electrode assembly welded to a terminal.
Figure 11B:
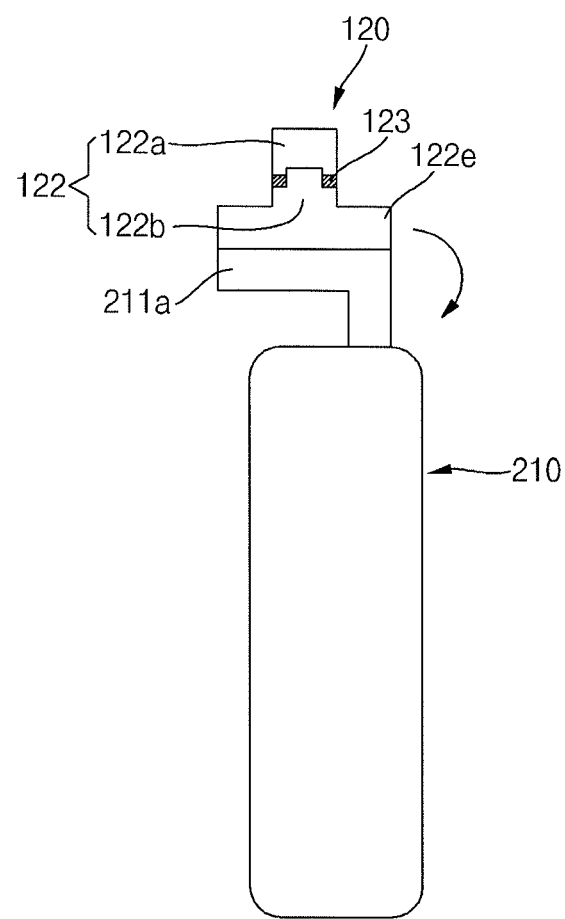
FIG. 11B illustrates a schematic diagram showing a bent electrode tab.

FIG. 11A illustrates a schematic diagram showing an electrode tab of an electrode assembly welded to a terminal, and FIG. 11B illustrates a schematic diagram showing a bent electrode tab. Here, the term "terminal" is exemplarily used to refer to a first terminal, but not limited thereto. For example, the term "terminal" may also be construed to refer to a second terminal.

As illustrated in FIG. 11A, an electrode tab 211a may extend from an electrode assembly 210, and a lengthwise direction of the electrode tab 211a may be the same as a lengthwise direction or a winding axis direction of the electrode assembly 210. The electrode tab 211a may be directly welded to a planar flange 122e at a bottom end of a terminal pillar 122 by, e.g., laser beams. In an implementation, resistance welding or ultrasonic welding may alternatively be adopted.

As illustrated in FIG. 11B, the electrode tab 211a may be bent roughly at a right angle from the terminal 120. For example, electrode tab 211a may be bent in a roughly 'L' shape. Therefore, a winding axis of the electrode assembly 210, a terminal axis of the terminal 120 and a tab axis of the electrode tab 211a may be substantially parallel or even with one another. Practically, the terminal axis of the terminal 120 and the tab axis of the electrode tab 211a may be connected to each other. For example, a top end of the tab axis of the electrode tab 211a may be connected to a bottom end of the terminal axis of the terminal 120.

As described above, according to an embodiment, the electrode tab of the electrode assembly may be directly electrically connected to the terminal, thereby simplifying the electrical connection between the electrode assembly and the terminal and advantageously reducing a number of components in the rechargeable battery.

FIG. 12 illustrates a schematic diagram showing two electrode assemblies welded to one terminal.

As illustrated in FIG. 12, a pair of electrode assemblies 210A and 210B may be electrically connected to one terminal 120. For example, electrode tabs 211a extending from the pair of electrode assemblies 210A and 210B may be electrically connected to a planar flange 122e at a lower portion of a, e.g., single, terminal pillar 122 of a terminal 120.

For example, the electrode tabs 211a extending from the electrode assemblies 210A and 210B may be bent to be symmetrical or asymmetrical with each other in view of the terminal 120.

As described above, at least one pair of electrode assemblies may be directly connected to one terminal through electrode tabs, and the rechargeable battery having low internal resistance and large capacity may be easily fabricated.

The embodiments may provide a rechargeable battery having a terminal made of different materials.

As described above, in the rechargeable battery according to an embodiment, the first pillar made of or including, e.g., aluminum or an aluminum alloy, may be welded to the second pillar made of or including, e.g., copper or a copper alloy, by the welding member. Thus, the terminal plate made of aluminum or an aluminum alloy may be easily welded to the first pillar made of or including, e.g., aluminum or an aluminum alloy. Further, a bus bar made of or including, e.g., aluminum or an aluminum alloy (a member connecting a plurality of rechargeable batteries to each other in series or in parallel), may also be easily welded to the terminal plate.

For example, the negative electrode terminal pillar may be divided into a first pillar and a second pillar, the first pillar may be made of or may include, e.g., aluminum or an aluminum alloy, the second pillar may be made of or may include, e.g., copper or a copper alloy, and the first and second pillars may be welded to each other by a separate welding member, thereby allowing the negative electrode terminal plate made of aluminum or an aluminum alloy and the first pillar made of aluminum or an aluminum alloy to be easily welded to each other.

In addition, the welding member may have a relatively low melting point and may have excellent flowability in a melted state, the welding member, e.g., an aluminum-silicon alloy or a tin-nickel alloy, which is unlikely to be cracked during congelation, may be used, and the first pillar and the second pillar may be easily welded to each other.

The first pillar made of or including, e.g., aluminum or an aluminum alloy, and the second pillar made of or including, e.g., copper or a copper alloy, may be highly sensitive to welding cracks (e.g., highly prone to welding cracks), and the welding member may help reduce the sensitivity to welding cracks.

In addition, according to an embodiment, the welding member may be made of the same material with the second pillar previously formed by performing electroplating or diffusive welding on the first pillar or with the first pillar previously formed by performing electroplating or diffusive welding on the second pillar. In such a case, the welding member may be previously formed using the same material with a target to be welded, and the first pillar and the second pillar may be easily welded to each other by the welding member even if they are made of different materials.

According to an embodiment, the winding axis of the electrode assembly and the terminal axis of the terminal may be substantially parallel with each other. Therefore, high electrolyte impregnating capability may be demonstrated when the electrolyte is injected into the electrode assembly and internal gases rapidly move to a safety vent when the rechargeable battery is overcharged, thereby allowing the safety vent to rapidly operate.

According to an embodiment, an electrode tab (e.g., an uncoated portion or a separate member) of the electrode assembly may be directly electrically connected to the terminal, and an electric path may be shortened, thereby lowering internal resistance of the rechargeable battery and reducing the number of components in the rechargeable battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   a case;
   a cap plate installed on the case; and
   a terminal, the terminal including:
      a terminal pillar protruding from the cap plate, and
      a terminal plate coupled to the terminal pillar,
   wherein the terminal pillar includes:
      a first pillar coupled to the terminal plate;
      a second pillar coupled the first pillar; and
   a welding member on an exterior of the first pillar or the second pillar, wherein:

the first pillar includes a groove, the second pillar includes a protrusion engaged with the groove, and the welding member is on a surface of the protrusion.

2. The rechargeable battery as claimed in claim 1, wherein the terminal plate and the first pillar are made of a same material.

3. The rechargeable battery as claimed in claim 1, wherein the terminal plate and the first pillar are made of aluminum or an aluminum alloy.

4. The rechargeable battery as claimed in claim 1, wherein the first pillar and the second pillar are made of different materials.

5. The rechargeable battery as claimed in claim 1, wherein:

the first pillar is made of aluminum or an aluminum alloy, and the second pillar is made of copper or a copper alloy.

6. The rechargeable battery as claimed in claim 1, wherein the welding member is made of an alloy that includes aluminum and silicon.

7. The rechargeable battery as claimed in claim 6, wherein the alloy of the welding member is made of about 80 to about 95 wt % aluminum and about 5 to about 20 wt % silicon.

8. The rechargeable battery as claimed in claim 1, wherein the welding member is made of an alloy that includes tin and nickel.

9. The rechargeable battery as claimed in claim 8, wherein the alloy of the welding member is made of about 60 to about 70 wt % tin and about 30 to about 40 wt % nickel.

10. The rechargeable battery as claimed in claim 1, wherein the first pillar and the terminal plate are coupled to each other by welding.

11. The rechargeable battery as claimed in claim 1, further comprising a second terminal, the second terminal including:

a second terminal pillar protruding from the cap plate, and a second terminal plate coupled to the second terminal pillar.

12. The rechargeable battery as claimed in claim 11, wherein the second terminal pillar and the second terminal plate are made of a same material.

13. The rechargeable battery as claimed in claim 1, further comprising an electrode assembly within the case, the electrode assembly being electrically connected to the terminal, wherein a winding axis of the electrode assembly is perpendicular to a terminal axis of the terminal.

14. The rechargeable battery as claimed in claim 1, further comprising an electrode assembly within the case, the electrode assembly being electrically connected to the terminal, wherein a winding axis of the electrode assembly is parallel to a terminal axis of the terminal.

15. The rechargeable battery as claimed in claim 14, further comprising an electrode tab between the electrode assembly and the terminal, wherein the electrode tab extends from a top end of the electrode assembly to a bottom end of the terminal and is directly connected to the terminal.

16. The rechargeable battery as claimed in claim 15, wherein the electrode tab is:

an uncoated portion of the electrode assembly, the uncoated portion not being coated with an active material, or a separate member connected to the uncoated portion of the electrode assembly.

17. The rechargeable battery as claimed in claim 15, wherein the electrode tab is connected to the terminal and is bent.

18. The rechargeable battery as claimed in claim 17, wherein the electrode assembly includes at least one pair of electrode assemblies.

19. A rechargeable battery, comprising:

a case;

a cap plate installed on the case; and a terminal, the terminal including:

a terminal pillar protruding from the cap plate, and a terminal plate coupled to the terminal pillar, wherein the terminal pillar includes:

a first pillar coupled to the terminal plate;

a second pillar coupled the first pillar; and a welding member on an exterior of the first pillar or the second pillar, wherein:

the first pillar includes a protrusion, the second pillar includes a groove engaged with the protrusion, and the welding member is on a surface of the protrusion.

* * * * *